(12) United States Patent
Roberts

(10) Patent No.: US 11,745,716 B2
(45) Date of Patent: Sep. 5, 2023

(54) SPRING BRAKE PUSHROD TO PARK DIAPHRAGM INTERFACE

(71) Applicant: Bendix Commercial Vehicle Systems LLC, Elyria, OH (US)

(72) Inventor: Will E. Roberts, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 303 days.

(21) Appl. No.: 17/130,383

(22) Filed: Dec. 22, 2020

(65) Prior Publication Data

US 2022/0194347 A1    Jun. 23, 2022

(51) Int. Cl.
*B60T 17/08*    (2006.01)

(52) U.S. Cl.
CPC .......... *B60T 17/083* (2013.01); *B60T 17/085* (2013.01); *B60T 17/088* (2013.01)

(58) Field of Classification Search
CPC .... B60T 17/083; B60T 17/088; B60T 17/085; B60T 13/38
See application file for complete search history.

(56) References Cited

U.S. PATENT DOCUMENTS

| 5,507,217 A | 4/1996 | Plantan |
| 6,164,187 A * | 12/2000 | Stojic .................... B60T 17/083 92/99 |
| 8,100,047 B2 | 1/2012 | Fisher et al. |
| 8,453,556 B2 | 6/2013 | Plantan et al. |
| 9,765,835 B2 | 9/2017 | Plantan et al. |
| 2010/0095836 A1* | 4/2010 | Fisher .................... B60T 17/083 92/48 |
| 2011/0219946 A1 | 9/2011 | Plantan et al. |
| 2013/0075206 A1* | 3/2013 | Plantan ................ B60T 17/088 188/170 |

FOREIGN PATENT DOCUMENTS

| CN | 205034103 U | 2/2016 |
| EP | 1 624 154 B1 | 4/2008 |
| IN | 249825 | 4/2010 |
| WO | WO 2017/200550 A1 | 11/2017 |

* cited by examiner

*Primary Examiner* — Abi Y Teka
(74) *Attorney, Agent, or Firm* — Crowell & Moring LLP

(57) ABSTRACT

An interface between an adapter push rod and a parking brake diaphragm seal includes an axial projection at one end of the push rod, a thread extending axially between a free end of the projection and a remainder of the push rod, and a washer having an approximately conical wall extending radially inwardly from an outer circumference of the washer towards a central mounting connection having a radial flange. A nut is threaded over the free end of the projection, and an opening in a hardened element is aligned axially with the projection to receive the projection. A circumferential groove defined in a side of the radial flange forms a boundary between the approximately conical wall and a remainder of the washer, and a portion of the diaphragm seal is pressed by the nut and the hardened element into the circumferential groove to produce a sealing bead.

19 Claims, 2 Drawing Sheets

SPRING BRAKE PUSHROD TO PARK DIAPHRAGM INTERFACE

BACKGROUND OF THE INVENTION

Field of the Invention

In certain brake actuator designs, there are problematic issues associated with installing a clip correctly and providing the correct amount of compression to seal the diaphragm. For example, a conical washer is not strong enough to support a high output spring. In another configuration, a threaded connection to the pressure plate may result in threaded joint failure. In this configuration, loading from the spring or frozen water buildup in the spring housing may cause the pressure plate to tilt to one side. When this happens, either the threads in the pressure plate may strip or the adapter push rod may break. The present invention is intended to address these and other issues.

Description of Related Art

International Publication WO 2017/200550 A1 to Koelzer et al. discloses a brake actuator assembly including a pressure plate presenting an opening, a push rod that is coupled to the pressure plate, a diaphragm that is coupled to the pressure plate, and a retainer that engages the push rod.

European Patent Specification EP 1 624 154 B1 to Plantan et al. discloses a diaphragm-type pneumatic brake actuator in which the diaphragm is releasably secured to the piston as the diaphragm is inverted during actuation of the braking system of a vehicle, thereby reducing wear of the flexible diaphragm.

U.S. Pat. No. 6,164,187 to Stojic discloses a spring brake actuator with a first spring brake chamber filled with compressed air, a second spring brake chamber housing a large-force compression spring, and an elastomeric diaphragm having a centrally-disposed aperture separating the first and second spring brake chambers.

U.S. Pat. No. 8,453,556 B2 to Plantan et al., issued Jun. 4, 2013, discloses a brake actuator having a plurality of actuator housing portions, with a diaphragm seal partially delimiting a parking brake de-actuation chamber and retained between adjacent portions of the housing and utilizing a clip or similar element.

U.S. Pat. No. 9,765,835 B2 to Plantan et al., issued Sep. 19, 2017, discloses brake actuator having a plurality of actuator housing portions, with a diaphragm seal partially delimiting a parking brake de-actuation chamber and retained between adjacent portions of the housing, including a threaded connection to a pressure plate.

Other documents that may be of interest are Chinese Publication CN205034103U to Bian et al., Indian Patent 249825 to Selvamani et al., U.S. Patent Application Publication US 2011/0219946 A1 to Plantan et al., U.S. Pat. No. 8,100,047 B2 to Fisher et al., and U.S. Pat. No. 5,507,217 A to Plantan.

SUMMARY OF THE INVENTION

A new adapter push rod to parking brake diaphragm seal interface is provided. The push rod has one end with a shelf for a conically-shaped seal and a threaded or partially threaded end. The conically-shaped seal is partly defined by an axially extending groove to seal the park diaphragm. A shoulder on the push rod serves to set the amount of diaphragm compression when the end is assembled. The park diaphragm has a hole in the center corresponding to a washer hub, and the park diaphragm is compressed by a nut received by the push rod.

Having the benefit of a threaded joint to set the compression and sealing of the park diaphragm eliminates the issue with the clip not being installed correctly or slipping. The conical interface to the pressure plate allows any tilt in the pressure to happen and not weaken the joint. By having the conical seal have a variable thickness, instead of being a washer, the design can be adjusted to support the required load of the higher output springs. A unique feature about the idea with respect to prior art is the inclusion of axial grooves on the conical seal.

In one preferred arrangement, the interface between the adapter push rod and the parking brake diaphragm seal includes an axial projection at one end of the push rod, a thread extending axially between a free end of the projection and an abutment formed at a junction of the projection and a remainder of the push rod, and a washer having an approximately conical wall extending radially inwardly from an outer circumference of the washer towards a central mounting connection of the washer, the central mounting connection having a radial flange. A nut having a thread matching the thread extending axially between the free end of the projection and the abutment, and a hardened element having an opening aligned axially with the axial projection, the opening in the hardened element receiving the projection. A circumferential groove defined in at least one side of the radial flange forms a boundary between the approximately conical wall and a remainder of the washer, and a portion of the diaphragm seal is pressed by the nut and the hardened element into the circumferential groove to produce a sealing bead. The axial projection may have a diameter smaller than a remainder of the push rod, and the thread extending axially between the free end of the projection and the abutment may extend only partly or completely along the projection.

The hardened element can take the form of a washer interposed between the nut and an end surface of the washer having the approximately conical wall, or could be a parking piston located between the nut and an end surface of the washer having the approximately conical wall. The central mounting connection of the washer defines an axial bore or channel dimensioned to freely receive the projection of the push rod, with the bore or channel extending through a hub of the washer. The hub of the washer includes an end surface, a circumferential outer side surface, and a radial flange extending from the hub to the circumferential groove, with the radial flange being disposed at an axial distance from the end surface of the hub. The invention also concerns a brake actuator including such an interface, as well as a process of creating the interface.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
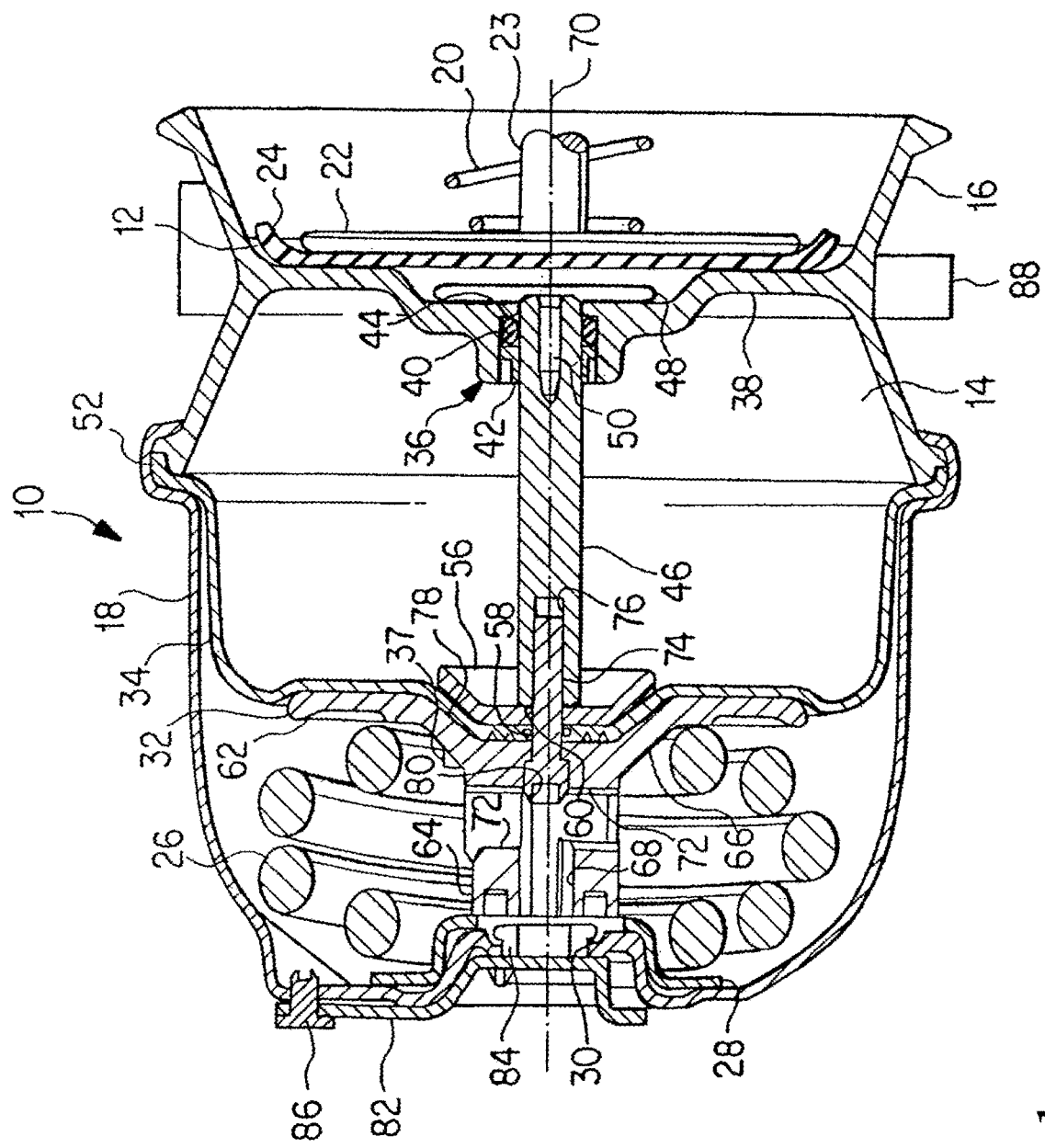
FIG. 1 is a lateral sectional view of a known brake actuator of a type in which the present invention can be incorporated.

The present invention shares a number of features in common with the brake actuator forming the subject matter of U.S. Pat. No. 9,765,835 B2 to Plantan et al. mentioned above. Relevant details of the Plantan et al. '835 B2 patent are shown in prior art FIG. 1, and a detailed description of prior art FIG. 1 is supplied below for completeness. It is to be understood that much of the detailed description of prior art FIG. 1 applies as well to an overall arrangement in which a new interface between an adapter push rod and a parking brake diaphragm seal according to the present invention can be utilized. The present invention also shares certain characteristics with the brake actuator arrangement forming the subject matter of U.S. Pat. No. 6,164,187 to Stojic mentioned above. The entire disclosures of the Plantan et al. '835 B2 and Stojic '187 patents are incorporated herein by reference.

The known brake actuator 10 illustrated in FIG. 1 has a service brake actuation chamber 12 and a parking or emergency brake de-actuation chamber 14, and includes a first, preferably cast metal or metal alloy housing portion 16, a second housing portion (not shown) within which the service brake actuation chamber 12 is expansible and contractible, and a third housing portion 18 disposed on a side of the first housing portion 16 opposite the second housing portion. In a conventional manner, supply of fluid to the service brake actuation chamber 12 pressurizes that chamber in opposition to the force applied by a service brake return spring 20, which acts upon a force or pressure distributing element 22 for a service brake diaphragm seal 24 that partially delimits the service brake actuation chamber 12. As the second housing portion is located closest to a vehicle brake to which the actuator 10 is to be connected, it may be referred to as a "front" housing portion, while the third housing portion 18 is located farthest from the vehicle brake, and, accordingly may be referred to as a "rear" housing portion. The first housing portion 16 thus constitutes an "intermediate" housing portion, and, in FIG. 1, "front" is the direction toward the right side, and "rear" is the direction toward the left side. Expansion and contraction of the service brake actuation chamber 12, accordingly, results in frontward and rearward movement of the pressure distributing element 22 and a brake actuator rod 23 associated with that element 22 for service brake operation and release.

Operating elements of the brake actuator 10 include a parking or emergency brake actuator spring 26 that has one end abutting a first actuator spring seat formed by a reinforcement plate 28, disposed within the third housing portion 18 around a central housing portion opening 30. An opposite end of the parking or emergency brake actuator spring 26 rests on a second actuator spring seat defined by the rear-facing side of a parking piston 32. A parking brake diaphragm seal 34 engages on a front-facing side of the parking piston 32 and partially delimits the parking or emergency brake de-actuation chamber 14.

A seal arrangement 36 cooperates with a radially extending wall 38 of the first housing portion 16. As illustrated, the seal arrangement 36 includes an o-ring 40 pressed by a retaining collar 42 against a shoulder 44. The o-ring 40 extends circumferentially around a central aperture in the wall 38, so that the seal arrangement 36 cooperates with the outer surface of an adapter push rod 46, displaceable through the central aperture, to fluid-tightly separate the service brake actuation chamber 12 from the parking or emergency brake de-actuation chamber 14. Movement of the adapter push rod 46 through the central aperture in the wall 38 will occur upon release of fluid from the parking or emergency brake de-actuation chamber 14 as will be described. A ring or plate 48 serves as a force or pressure distributing element for the service brake diaphragm seal 24 upon release of fluid from the parking or emergency brake de-actuation chamber 14. The ring or plate 48 is secured by a screw 50 or other such fastener to a front end of the adapter push rod 46. It is to be understood that the parking or emergency brake actuator spring 26 could be either a coil spring, as illustrated, or any other type of elastic element that provides the energy storage and return functions required by a parking brake actuator, such as multiple coil springs, leaf springs, cantilevered springs, resilient blocks, or chargeable high pressure bladders.

The radial outer circumference 52 of the parking brake diaphragm seal 34 defines an outer edge that is clamped between adjacent ends or sections of the intermediate and rear housing portions 16, 18, while the radial inner edge 54 of the parking brake diaphragm seal 34 is retained on an end of the adapter push rod 46 in a manner to be described. The brake de-actuation chamber 14 is thus defined within a volume delimited by the first housing portion 16, the parking brake diaphragm seal 34, a conical washer 56, an optional central o-ring seal 58, the seal arrangement 36, and the adapter push rod 46.

The brake de-actuation chamber 14 is shown in FIG. 1 in an operational condition, with the parking piston 32 in a fully withdrawn position. This position is achieved when sufficient pneumatic pressure to overcome the spring force developed by the parking or emergency brake actuator spring 26 has been supplied, via a supply port (not illustrated), to the chamber 14. Opposite the brake de-actuation chamber 14, the third housing portion 18 is vented to atmosphere, for example by way of wall openings in that third housing portion.

The service brake diaphragm seal 24 may be attached at its outer circumference (not shown) between adjacent ends of the intermediate housing portion 16 and the front housing portion in a manner similar to that in which the radial outer circumference 52 of the seal 34 is attached between adjacent ends of the intermediate and rear housing portions 16 and 18. The brake actuator rod 23 abuts against, is attached to, and/or is formed together with a central area of the pressure distributing element 22.

With a service brake actuation chamber 12 configured as shown in FIG. 1, actuation and release of a vehicle service brake can be effected, when the vehicle is running and the parking or emergency brake de-actuation chamber 14 is pressurized, by supplying air through an appropriate feed line to the service brake actuation chamber 12 and discharging the air supplied to the chamber 12, respectively. Increasing pressurization of the chamber 12 results in a force acting on the element 22, which overcomes the force applied by the return spring 20, thereby moving the brake actuator rod 23 in a brake application direction, i.e. to the right in FIG. 1. Decreasing pressurization of the chamber 12, of course, permits movement of the rod 23 and the element 22 in an opposite, service brake release direction, i.e. to the left in FIG. 1.

When a brake fluid supply system failure occurs, or when the vehicle is no longer running, the parking or emergency brake de-actuation chamber 14 is depressurized. A pressure loss in the chamber 14 permits the parking or emergency brake actuator spring 26 to expand, thereby displacing the parking piston 32 toward the second housing portion, i.e. toward the front of the actuator 10. The parking piston 32 is seated on the parking brake diaphragm seal 34, which, in turn, is seated on the conical washer 56 retained in position on the adapter push rod 46 by way of a shoulder 60. As the parking or emergency brake actuator spring 26 is stronger than the return spring 20, for example by having a force constant which is greater than that of the return spring 20, the push rod 46 is displaced through the aperture in the wall 38 receiving the seal arrangement 36 to the right in FIG. 1 and, in turn, displaces the element 22 and the brake actuator rod 23 in a brake application direction. Pressurizing the chamber 14 again, upon fluid supply system repair or when the vehicle is again running, displaces the push rod 46 in an opposite direction, compresses the spring 26, and discontinues parking or emergency brake application. During normal vehicle operation, the parking or emergency brake actuator spring 26 remains compressed, and service brake application and release is performed by respective pressurization of and relief of fluid pressure from the service brake actuation chamber 12.

A conventional caging bolt (not shown) is used in conjunction with a threaded nut (not shown) to retain the manual parking or emergency brake actuator spring 26 in a compressed condition during servicing or in other situations when the chamber 14 is depressurized.

The parking piston 32 includes an approximately disk-like outer circumferential section 62, an upstanding central section 64, and an approximately conical intermediate section 66 disposed between the outer and central sections 62 and 64. The parking piston 32 is provided with several passageways, including an axial passageway 68 in the central section 64. The axial passageway 68 is aligned with a longitudinal axis 70 of the brake actuator 10 and, although such is not visible in FIG. 1, has an oblong cross section. The axial passageway 68 opens into approximately sector shaped openings 72 extending laterally within the central section 64. Walls of the sector shaped openings 72 cooperate with the T-shaped end of a parking spring caging bolt or other such release tool (not shown) when the parking or emergency brake actuator spring 26 is to be mechanically compressed and rendered inoperative.

The approximately disk-like outer circumferential section 62 also includes spring end coil positioning projections (not shown), reinforcing ribs 37 extending between and formed together with the central and intermediate sections 64 and 66, and optional bearing protrusions (not shown) for supporting the reinforcement plate 28.

In the configuration of the Plantan et al. '835 B2 patent, a central bolt 74 is utilized to securely interconnect the parking piston 32, an interior central portion of the parking brake diaphragm seal 34, the conical washer 56, and the adapter push rod 46 together. To interconnect the elements mentioned, a threaded shank of the bolt 74 is passed through aligned central holes in the parking piston 32, the diaphragm seal 34, and the conical washer 56, and into a threaded bore 76 extending axially into the adapter push rod 46. The conical washer 56 is fixed in position relative to the adapter push rod 46 by way of the shoulder 60 mentioned previously. Consequently, as the bolt is screwed into the bore 76 and tightened, the conical washer 56 is withdrawn into a matching recess 78 formed in the parking piston 32 to clamp the interior central portion of the diaphragm seal 34 against the surface of the recess 78. An overall clamping arrangement, including the conical washer 56, the shoulder 60, the bolt 74, and the bore 76, thus operates to constrain the central diaphragm seal portion for movement with both the push rod 46 and the piston 32. A suitable tool may be inserted through the central opening 30 and through the axial passageway 68 to rotate the bolt 74; in the particular arrangement illustrated, a hexagonal recess 80 is provided in the head of the bolt 74 to receive a correspondingly configured Allen wrench. After the parking piston 32, the interior portion of the parking brake diaphragm seal 34, the conical washer 56, and the adapter push rod 46 are securely interconnected by the bolt 74, a dust plug 82 may be placed over the central housing portion opening 30 to avoid contamination of the volume within the third housing portion 18. The parking piston 32 may include grooves on its front facing side to improve gripping of the diaphragm seal 34. Clips 84 receivable within the opening 30, rivets 86 interconnecting the dust plug 82 and the third housing portion 18, or both such rivets and clips may be used to secure the dust plug in position over the opening 30. The overall brake actuator 10 may be secured to a vehicle by way of a connection element 88 formed with or connected to the first housing portion 16.

The Plantan et al. '835 B2 patent thus discloses a spring brake actuator arrangement that eliminates the need for a parking pushrod return spring, provides a robust connection of the parking piston 32 to the adapter push rod 46, and eliminates the need to press fit the conical washer 56 on the push rod 46 is provided. The central bolt 74 preloads the parking piston 32 to adapter push rod 46, sealing the parking brake diaphragm seal 34 to the conical washer 56 while securing conical washer 56 to the push rod 46.

Having the parking piston 32 fixed to the adapter push rod 46 includes distribution of loads imposed on the third housing portion 18. After the parking or emergency brake actuator spring 26 is fully compressed by way of air supplied at approximately 70-75 psi to the parking or emergency brake de-actuation chamber 14, additional loads at higher air pressure (typically 120 psi) that are normally imposed on the third housing portion 18 can be shared by the ring or plate 48 secured to the front end of the adapter push rod 46 as the ring or plate 48 pulls on the radially extending wall 38 of the first cast metal or metal alloy or stamped housing portion 16. This will reduce fatigue loads and could lead to elimination of the reinforcement plate 28.

Due to the interconnection provided by the bolt 74 and the threaded bore 76 in the adapter push rod 46, when the parking or emergency brake actuator spring 26 is manually caged, the adapter push rod 46 is pulled back to the zero stroke position, together with the parking piston 32, by way of the T-shaped end of the parking spring caging bolt or other release tool. Since the parking piston 32 of the Plantan et al. '835 B2 invention is rigidly connected to the adapter push rod 46, essentially all pivoting of the piston 32 relative to the parking brake diaphragm seal 34 is eliminated. The housing portions 16 and 18 and the elements associated therewith constitute a safety brake arrangement that can be connected to or retrofit with a separate service brake arrangement formed by the service brake diaphragm seal 24 and other elements to the front of that diaphragm seal 24.

Figure 2:
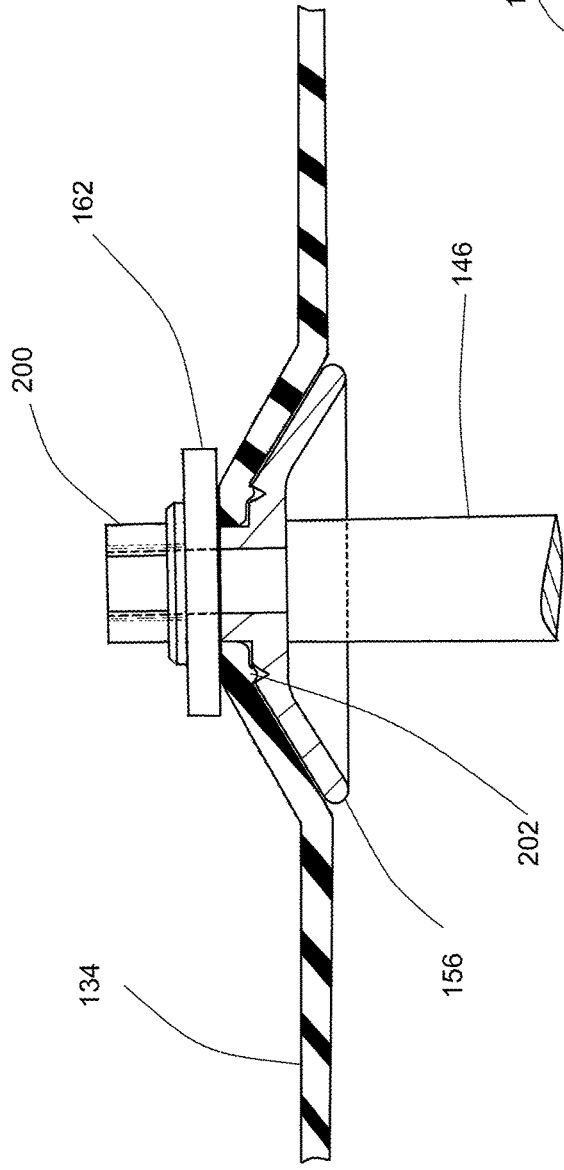
FIG. 2 is a part-sectional view of an improved spring brake push rod to park diaphragm interface according to the invention.

FIG. 2 is a part sectional view of the new interface between an adapter push rod 146 and a parking brake diaphragm seal 134 according to the present invention. When utilized in an environment such as that of the Plantan et al. '835 B2 actuator, cooperation of the parking brake diaphragm seal 134, the adapter push rod 146, a conical washer 156, and a hardened element 162 is designed to significantly improve certain characteristics exhibited by the known interface among the parking brake diaphragm seal 34, the adapter push rod 46, the conical washer 56, and the parking piston 32 in the Plantan et al. '835 B2 arrangement. If utilized in an environment such as that of the Plantan et al. '835 B2 actuator, moreover, the hardened element 162 could be formed so as to fit within a pocket of the parking piston 32 in the Plantan et al. '835 B2 actuator.

Figure 4:
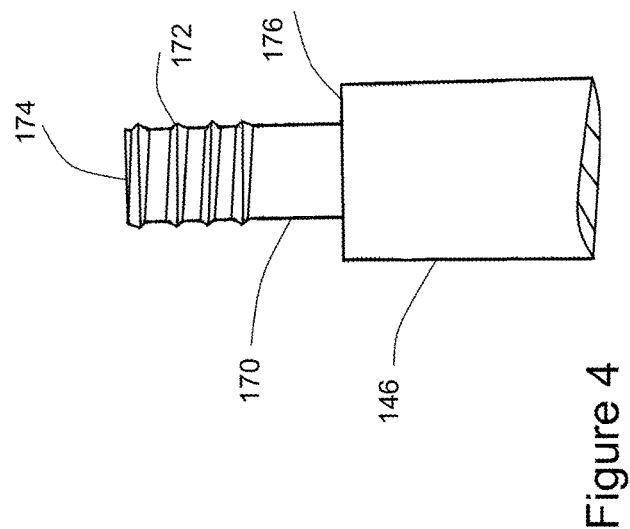
FIG. 4 is an enlarged view of one end of the spring brake push rod shown in FIG. 2.

As best seen in FIG. 4, one end of the spring brake push rod 146 has an axial projection 170 of smaller diameter or cross section than the main diameter or cross section of the push rod 146. The projection 170 includes an exterior thread 172 located between a free end 174 of the projection and the junction of that projection 170 with the remainder of the push rod 146. The thread 172 may extend, axially completely or only partly between the free end 174 and an abutment 176 formed at the junction of the projection 170 and the remainder of the push rod.

Figure 3:
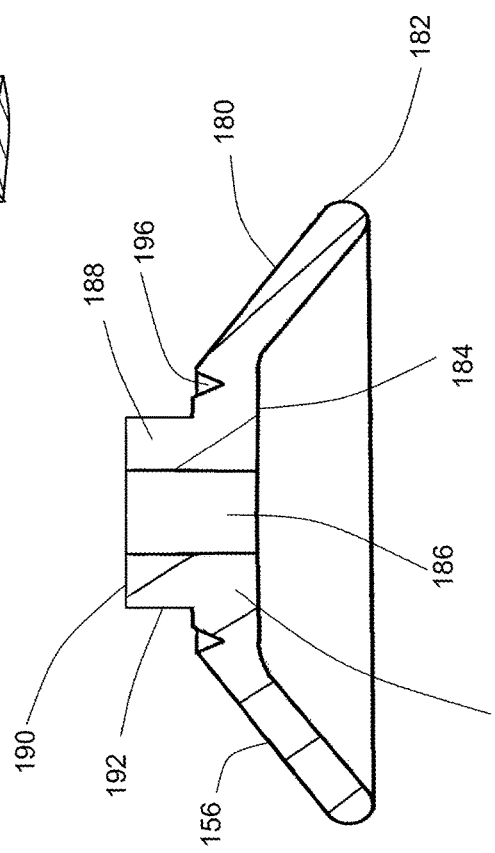
FIG. 3 is an enlarged sectional view of a conical washer forming part of the interface represented in FIG. 2.

The conical washer 156, shown in FIG. 3, includes an approximately conical wall 180 extending radially inwardly from an outer circumference 182 towards a junction between the wall 180 and a central mounting connection 184. The mounting connection 184 defines an axial bore or channel 186 suitably dimensioned to freely receive the projection 170 of the push rod 146. The channel 186 extends through a hub 188 of the conical washer 156. The hub 188 includes an end surface 190, a circumferential outer side surface 192, and a radial flange 194 extending from of the hub at an axial distance from the end surface 190. A circumferential groove 196 in at least one side of the radial flange 194 facilitates a seal with the diaphragm.

When assembling an adapter push rod 146 and a parking brake diaphragm seal 134 together to arrive at the construction shown in FIG. 2, the axial projection 170 of the push rod 146 is inserted into the channel 186 until the abutment 176 contacts a surface of the conical washer central mounting connection 184. An opening in the diaphragm seal 134 is aligned with the hub 188 to permit passage of the hub 188 through the diaphragm opening, and another, smaller opening in the hardened element 162 is aligned with the axial push rod projection 170, which is then passed through the opening in the conical washer or hardened element. The hardened element is steel or other material. A nut 200 having interior threads matching the exterior thread 172 is then secured on the push rod projection 170, compressing a portion of the diaphragm seal 134 into the groove 196 to produce a sealing bead 202 and resulting in a fluid-tight barrier at the junction of the parking brake diaphragm seal 134 and the adapter push rod 146. The nut 200 can be combined with the hardened element as one piece.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An interface between an adapter push rod and a parking brake diaphragm seal comprising:
    an axial projection of the push rod at one end of the push rod,
    a thread extending axially between a free end of the projection and an abutment of the push rod formed at a junction of the projection and a remainder of the push rod,
    a washer having an approximately conical wall extending radially inwardly from an outer circumference of the washer towards a central mounting connection of the washer, the central mounting connection having a radial flange and abutting the abutment when installed on the push rod,
    a nut having a thread matching the thread extending axially between the free end of the projection and the abutment, and
    a hardened element having an opening aligned axially with the axial projection, the opening in the hardened element receiving the projection,
    wherein a circumferential groove defined in at least one side of the radial flange forms a seal location between the approximately conical wall and a remainder of the washer, and a portion of the diaphragm seal is pressed by the nut and the hardened element into the circumferential groove to produce a sealing bead.

2. The interface of claim 1, wherein the axial projection has a diameter smaller than a remainder of the push rod.

3. The interface of claim 1, wherein the thread extending axially between the free end of the projection and the abutment extends only partly along the projection.

4. The interface of claim 1, wherein the thread extending axially between the free end of the projection and the abutment extends completely along the projection.

5. The interface of claim 1, wherein the hardened element is a flat washer interposed between the nut and an end surface of the washer having the approximately conical wall.

6. The interface of claim 1, wherein the hardened element is received in a pocket in a parking piston interposed between the nut and an end surface of the washer having the approximately conical wall.

7. The interface of claim 1, wherein the central mounting connection of the conical washer defines an axial bore or channel dimensioned to freely receive the projection of the push rod.

8. The interface of claim 7, wherein the bore or channel extends through a hub of the washer.

9. The interface of claim 8, wherein the hub of the conical washer includes an end surface, a circumferential outer side surface, and a radial flange extending from the hub to the circumferential groove.

10. The interface of claim 9, wherein the radial flange is disposed at an axial distance from the end surface of the hub.

11. The A brake actuator comprising:
    a plurality of actuator housing portions,
    a service brake diaphragm seal that, together with one of the actuator housing portions, partially delimits a service brake actuation chamber to be expanded and contracted by fluid supply and relief,
    a parking brake diaphragm seal, partially delimiting a parking brake de-actuation chamber that is separate from the service brake actuation chamber and is also to be expanded and contracted by fluid supply and relief, retained between another of the actuator housing portions adjacent to said one of the actuator housing portions,
    an elastic element disposed between the parking brake diaphragm seal and the other of the housing portions to oppose expansion of the parking brake de-actuation chamber,
    a push rod operable to produce brake actuation upon depressurization of the parking brake de-actuation chamber, the push rod extending through the parking brake de-actuation chamber,
    a piston, secured to and movable together with the push rod, secured to and movable with the parking brake diaphragm seal, and acting as a seat for the elastic element, and an interface between the push rod and the parking brake diaphragm seal, wherein the interface includes:

an axial projection of the push rod at one end of the push rod, a thread extending axially between a free end of the projection and an abutment of the push rod formed at a junction of the projection and a remainder of the push rod, a washer having an approximately conical wall extending radially inwardly from an outer circumference of the washer towards a central mounting connection of the washer, the central mounting connection having a radial flange and abutting the abutment when installed on the push rod, a nut having a thread matching the thread extending axially between the free end of the axial projection and the abutment, and a hardened element having an opening aligned axially with the axial projection, the opening in the hardened element receiving the projection, wherein a circumferential groove is defined in at least one side of the radial flange between the approximately conical wall and a remainder of the washer, and a portion of the parking brake diaphragm seal is pressed by the nut and the hardened element into the circumferential groove to produce a sealing bead.

12. The brake actuator of claim 11, wherein the axial projection has a diameter smaller than a remainder of the push rod.

13. The brake actuator of claim 11, wherein the thread extending axially between the free end of the projection and the abutment extends only partly along the projection.

14. The brake actuator of claim 11, wherein the thread extending axially between the free end of the projection and the abutment extends completely along the projection.

15. The brake actuator of claim 11, wherein the hardened element is a flat washer interposed between the nut and an end surface of the washer having the approximately conical wall.

16. The brake actuator of claim 11, wherein the hardened element is a parking piston interposed between the nut and an end surface of the washer having the approximately conical wall.

17. A process of creating an interface between an adapter push rod and a parking brake diaphragm seal, comprising:

mounting a washer, having an approximately conical wall extending radially inwardly from an outer circumference of the washer towards a central mounting connection of the washer against an abutment on the push rod, passing a hub of the washer through an opening in the diaphragm seal aligned with the hub, placing a hardened element having an opening over an axial projection of the push rod, and rotating a nut on the axial projection of the push rod relative to the axial projection of the push rod to press a portion of the diaphragm seal into a circumferential groove defined in at least one side of the washer and produce a sealing bead.

18. The process of claim 17, wherein the hardened element is a flat washer interposed between the nut and an end surface of the washer having the approximately conical wall.

19. The process of claim 17, wherein the central mounting connection of the conical washer defines an axial bore or channel dimensioned to freely receive the axial projection of the push rod.

* * * * *